United States Patent [19]

Rossi

[11] 4,290,797
[45] Sep. 22, 1981

[54] APPARATUS FOR DISPENSING AND SUBMERSING BATCH MATERIALS IN A MOLTEN GLASS FURNACE

[75] Inventor: Anthony T. Rossi, Bradenton, Fla.

[73] Assignee: Tropicana Products, Inc., Bradenton, Fla.

[21] Appl. No.: 118,978

[22] Filed: Feb. 6, 1980

[51] Int. Cl.³ .............................................. C03B 3/00
[52] U.S. Cl. .......................................... 65/335; 65/27
[58] Field of Search .................................. 65/27, 335

[56] References Cited

U.S. PATENT DOCUMENTS

| | | | |
|---|---|---|---|
| 1,761,229 | 6/1930 | Pederson | 65/335 |
| 1,999,761 | 4/1935 | Howard | 65/335 X |
| 2,479,805 | 8/1949 | Batchell | 65/27 |

Primary Examiner—Arthur D. Kellogg
Attorney, Agent, or Firm—Burns, Doane, Swecker & Mathis

[57] ABSTRACT

An apparatus for feeding glass batch materials into a pool of molten glass within a furnace comprises a base disposed at a batch-feeding end of the furnace above the pool of molten glass. A hopper for dispensing glass batch materials is mounted on the base and includes an outlet disposed above the molten glass. A plunger assembly is mounted on the base and includes a reciprocable plunger and an actuator for reciprocating the plunger in a linear direction past the hopper outlet into and from the pool of molten glass at the location where batch materials are deposited thereon. The plunger includes a pusher face for pushing dispensed batch materials beneath the surface of the pool of molten glass. A barrier is disposed on a side of the hopper outlet opposite the plunger. The barrier extends into the pool of molten material to the lowermost extent of the pusher face so that batch materials submerged by the plunger travel beneath the barrier and are isolated from the batch depositing location.

5 Claims, 6 Drawing Figures

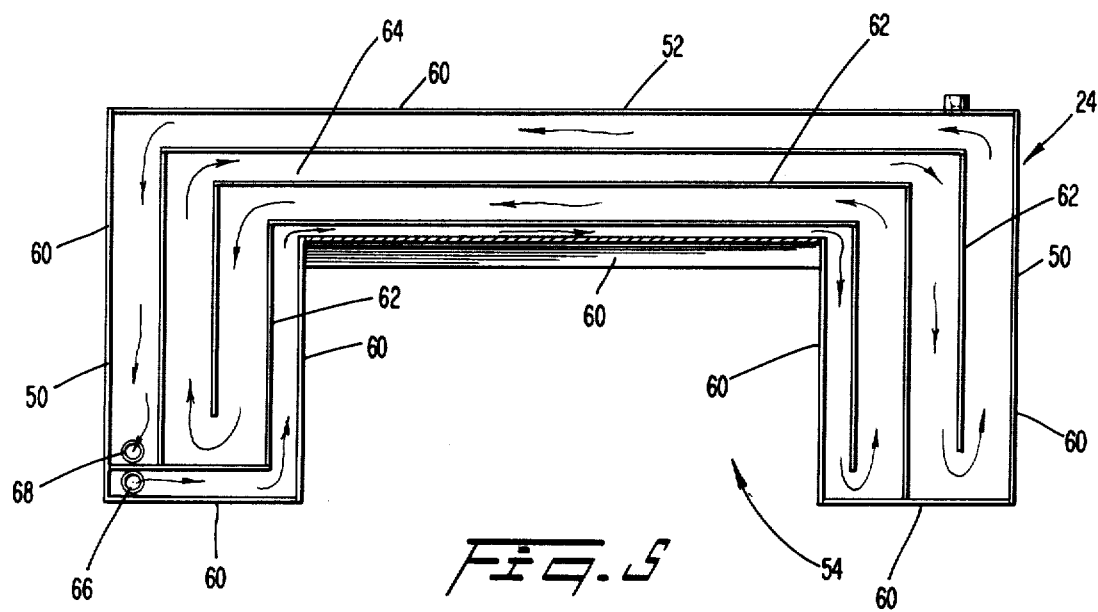
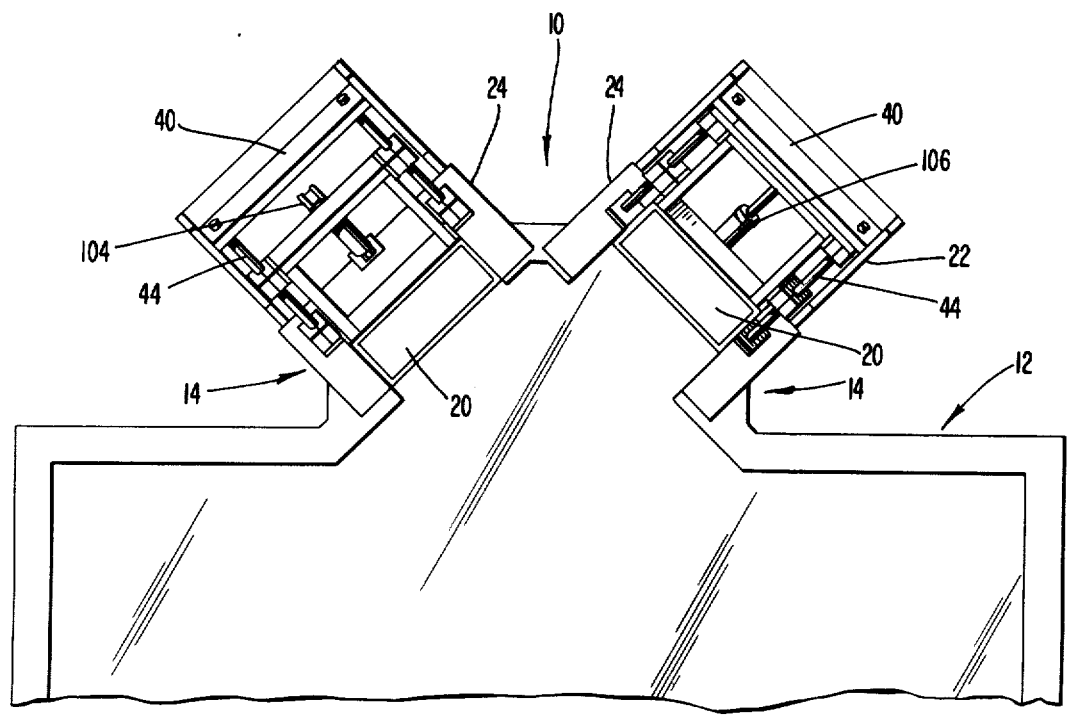

APPARATUS FOR DISPENSING AND SUBMERSING BATCH MATERIALS IN A MOLTEN GLASS FURNACE

BACKGROUND AND OBJECTS OF THE INVENTION

The present invention relates to the manufacture of glass articles and in particular, to the feeding of glass batch materials to a pool of molten glass in a glass furnace.

In the production of glass articles, such as glass bottles for example, a pool of molten glass is formed in a glass furnace, with the melt being drawn-off to appropriate molds or the like in which the articles are formed. The melt is periodically replenished by the addition of batch material in grannular form. The batch material is deposited directly onto the pool of molten material as from a hopper, for example.

The batch material is composed of fine particulate matter, which tends to sit on the surface of the pool of molten glass. It is important that the dispensed batch material be quickly incorporated into the melt, lest it be carried from the furnace along with the products of combustion.

Proposals have heretofore been made for effecting such incorporation as demonstrated, for example, by the disclosures in U.S. Pat. No. 1,905,534 issued to Wadman on Apr. 25, 1933; and U.S. Pat. No. 2,749,666 issued to Baque on June 12, 1956.

In one proposal, a batch feeding passage is formed in a wall of the furnace, with an outlet thereof disposed below the surface of the melt. A pusher bar reciprocates within the passage to displace batch material into the melt.

In another proposal a batch discharge hopper is secured to an upper wall of the furnace so as to overlie A "doghouse" portion of the furnace. A plunger is pivotably mounted to a side wall of the furnace for reciprocable movement in a curvalinear path past the outlet of the hopper, to push deposited batch material into the melt. The furnace wall to which hopper is mounted includes a passage within which the plunger travels. The batch material submerged by the plunger is caused to travel beneath that wall before rising to the melt surface. A floor-mounted motor is operably connected to the plunger to reciprocate the latter. The wall and plunger may contain internal channels for circulating cooling water.

Previous proposals may not function as effectively as desired and may require that considerable modifications be made to the furnace.

It is, therefore, an object of the invention to provide an improved apparatus for dispensing and submersing batch materials within a furnace.

It is another object of the invention to provide an effective mechanism which dispenses and submerges batch material and is easily adaptable to existing furnaces.

SUMMARY OF THE INVENTION

These objects are achieved by the present invention which involves apparatus for feeding glass batch material into a pool of molten glass within a furnace. The apparatus comprises a hopper for depositing glass batch material onto the surface of the pool of molten material. A plunger assembly comprises a reciprocable plunger and an actuator for reciprocating the plunger in a linear direction into and from the pool of molten glass at the location where batch materials are deposited thereon. The plunger includes a front pusher face for pushing batch materials beneath the surface of the pool of molten glass. A barrier extends into the pool of molten material toward the lowermost extent of the pusher face so that the batch materials submerged by the plunger travel beneath the barrier and are segregated from the batch depositing location.

Preferably, the base is U-shaped including a pair of leg portions and a bight portion. The leg portions extend horizontally over the pool of molten glass and define a recess therebetween. The bight portion is supported on the top of a side wall of the furnace. The leg portions and bight portion may contain internal water passages with an inlet and outlet for circulating cooling water. Cooling passages may also be provided in the base and barrier.

Preferably, the barrier is mounted for adjustable swinging movement to the base to adjust the inclination thereof relative to vertical.

THE DRAWING

The objects and advantages of the invention will become apparent from the following detailed description of a preferred embodiment thereof in connection with the accompanying drawings in which like numerals designate like elements, and in which:

FIG. 5 is a sectional view taken through the base component of the apparatus; and FIG. 6 is a plan view of the doghouse portion of the furnace depicting a pair of apparatuses for dispensing and submersing batch material.

DETAILED DESCRIPTION OF A PREFERRED EMBODIMENT OF THE INVENTION

Figure 1:
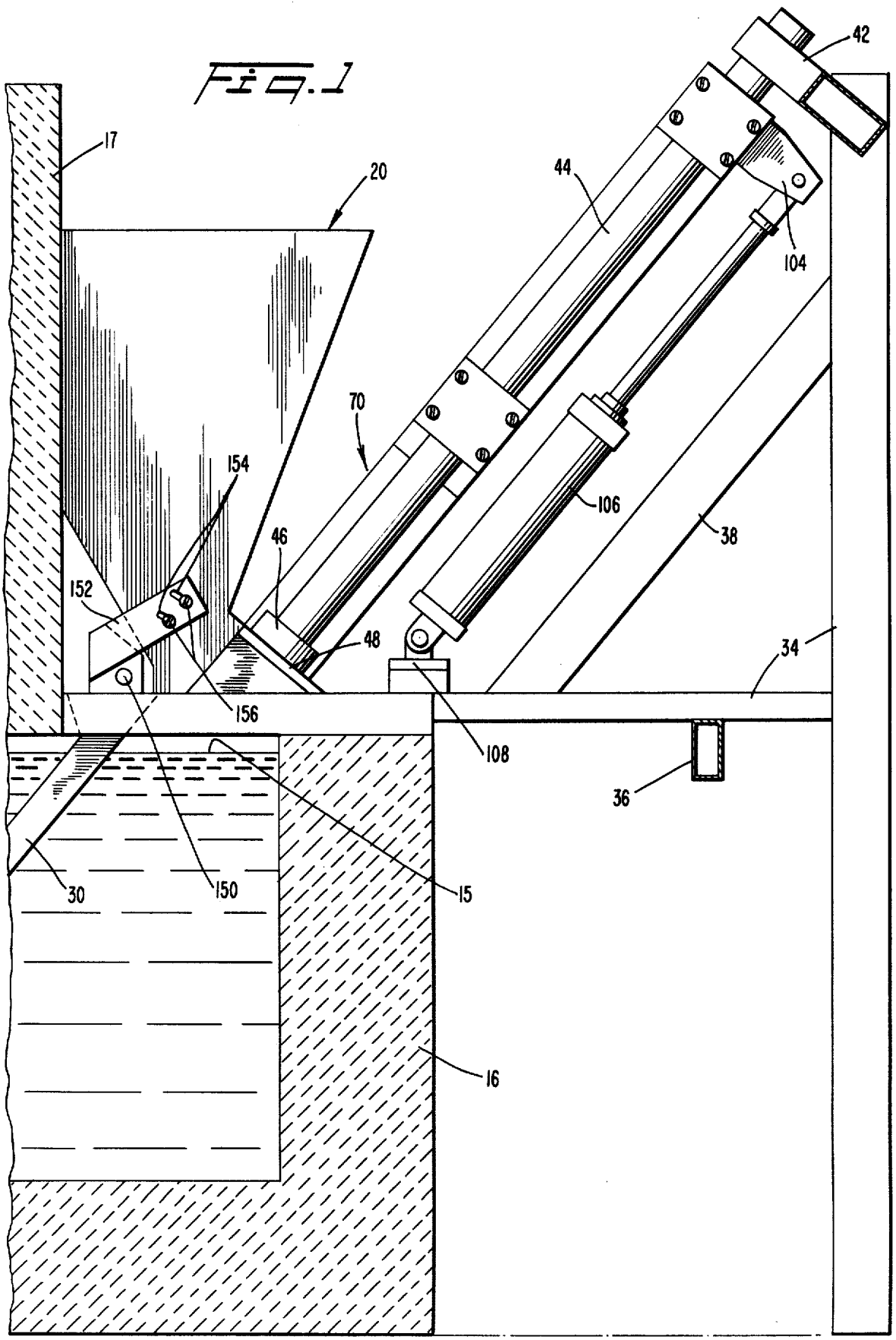
FIG. 1 is a side elevational view of an apparatus according to the present invention for dispensing batch material into a glass melt furnace and for submersing such material beneath the surface of the melt. The walls of the furnace are broken away to fully expose the apparatus.

In FIG. 6 there is schematically depicted, in plan view, a rearward end, or "doghouse" 10, of a molten glass furnace 12. The doghouse includes a pair of recessed compartments 14 which are open at their upper ends and communicate with the main pool 15 of molten glass. The compartments each include upstanding melt-confining side walls 16 (FIG. 1). Walls 17 of the furnace are positioned above and inwardly of the side walls 16. In practice, molten glass is formed in the furnace 12 and is drawn-off at a forward end (not shown). The melt is replenished by periodically adding glass batch material, of a conventional particulate composition, to the melt via the doghouse 10. Generally, batch material is added at one doghouse for a given period and then at another, such alternation assuring a more complete intermixing of batch materials with the pool of molten glass.

Disposed at each compartment 14 of the doghouse 10 is a stationary frame 22 which carries a batch feeding apparatus 20 that comprises a water-cooled base 24, a batch dispensing hopper 26, a water-cooled hopper for depositing batch materials onto the melt, a batch submersion plunger 28 for pushing deposited batch material below the melt surface, and a water-cooled barrier 30 for confining the submerged batch material against rearward travel.

The frame 22 includes a pair of upright parallel legs 32 and a pair of parallel arms 34 projecting horizontally from the legs 32 intermediate the ends thereof (only one leg 32 and arm 34 being visible in the drawing). The arms are interconnected by a lateral bar 36. Each associated leg 34 and arm 36 are braced by a diagonal brace member 38.

Extending between the upper ends of the legs 32 is a horizontal crossbeam 40. Mounted on opposite ends of the crossbeam 40 are retaining collars 42 which fixably secure the upper ends of a pair of guide rods 44. Lower ends of the guide rods are retained in a pair of collars 46 which are mounted on brackets 48 secured to legs 50 of the base member 24. As will be discussed hereinafter, the plunger 28 is slidably mounted on the guide rods 44.

The base member 24 is of generally U-shaped configuration comprising with spaced parallel legs 50 extending from a bight portion 52 (FIG. 5). The bight portion 52 is connected to the arms 34 of the frame 22 and rests upon the top of the wall 16, such that the legs 50 project over the pool of molten glass. As will be explained hereinafter in detail, the plunger 28, hopper 26, and barrier 30 are secured to the base. Between the spaced legs 50 of the base is defined a recess 54 through which the plunger 28 travels during a batch-submerging operation, as will be explained subsequently.

The base 24 includes top and bottom walls 56, 58 and side edge walls 60 connected therebetween and extending completely around the periphery of the base to define a water-tight compartment therewithin.

A plurality of divider walls 62 are disposed within the water-tight compartment and extend between the top and bottom walls 56, 58. The divider walls are arranged to define a water-tight serpentine passage 64 extending through the legs 50 and bight 52 from a water inlet 66 to a water outlet 68. The water inlet and outlet 66, 68 are disposed on the top wall 56 at an outer end of one of the legs 50 and are separated by a bulkhead plate 61.

Figure 3:
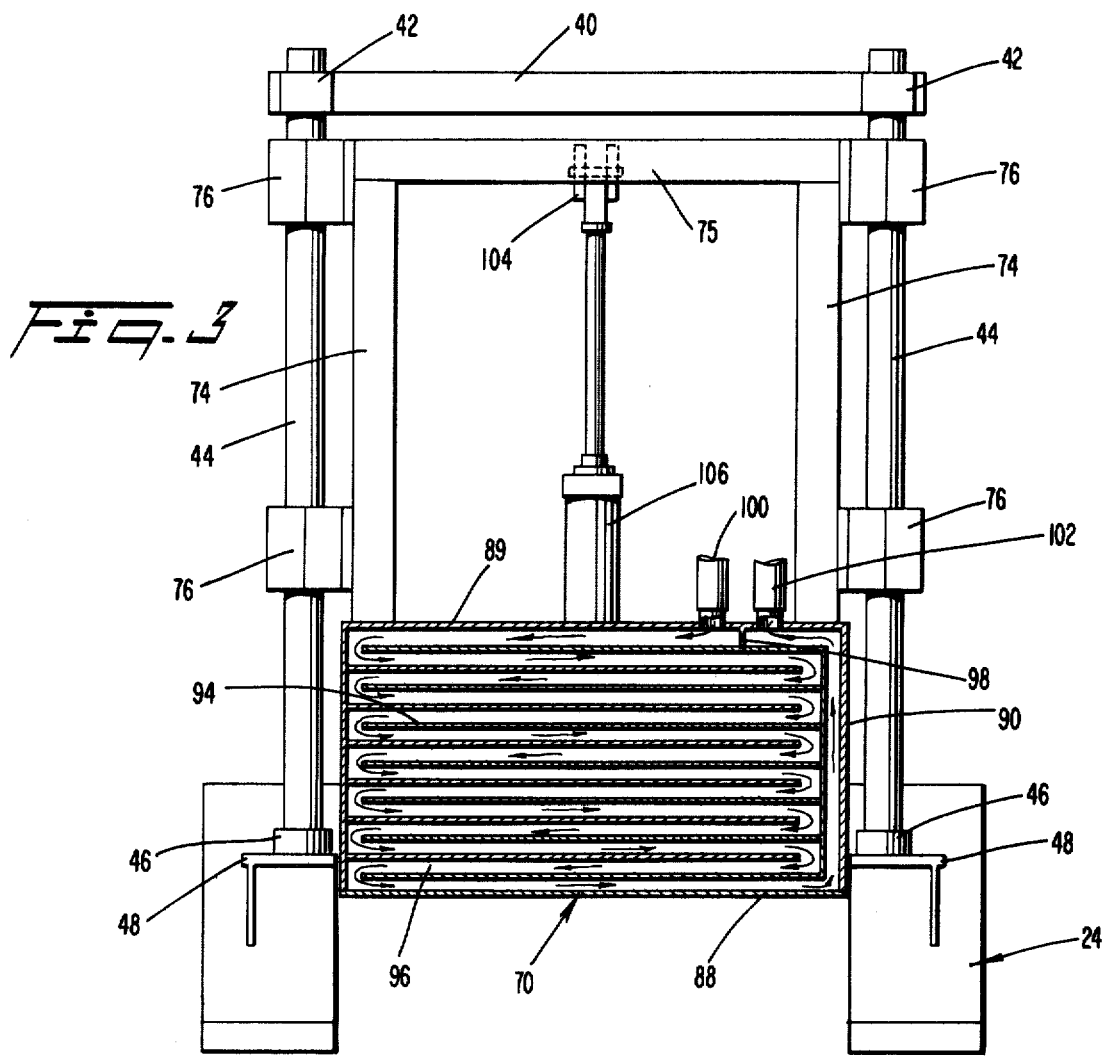
FIG. 3 is a plan view of the apparatus, with the hopper, barrier, and upper plate of the plunger removed for clarity.

The plunger 28 comprises a submersible lower portion 70 and non-submersible upper portion 72 which constitutes a support for the lower portion 70. The support portion 72 comprises a pair of parallel support arms 74 (FIG. 3) disposed parallel to and inwardly of the guide rods 44 which are mounted on the frame 22. A cross-member 75 interconnects the upper ends of the support arms 74. The support arms 74 each carry a pair of sleeves 76 through which the guide bars 44 extend.

Figure 2:
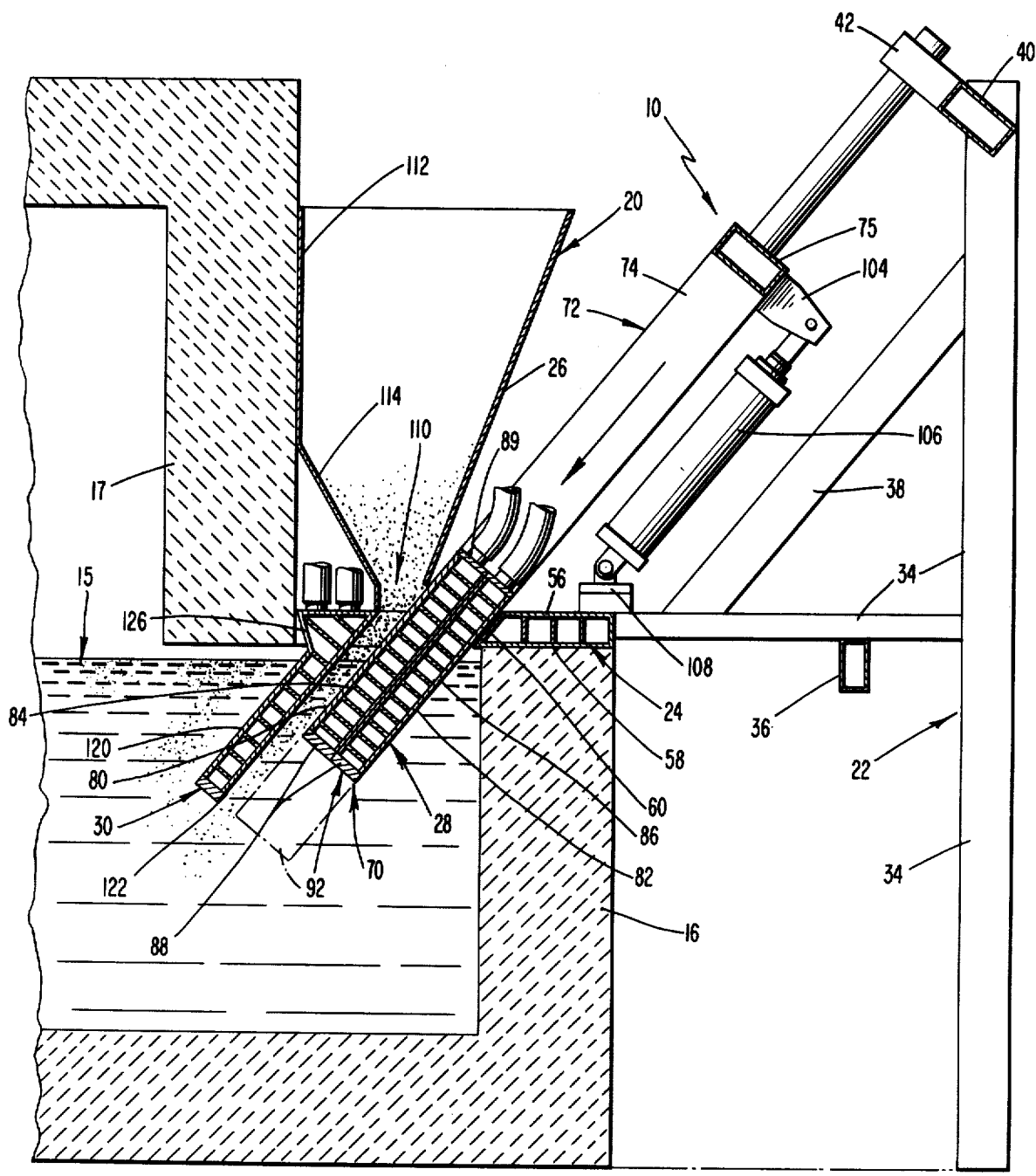
FIG. 2 is a view similar to FIG. 1, with the apparatus depicted in vertical cross-section.

The submersible portion 70 of the plunger 28 comprises a pair of rectangular water-cooled plunger units 80, 82 which are welded together one atop the other (FIG. 2). (In lieu of two interconnected units, a single one-piece unit can be employed.) Each unit 80, 82 comprises inner and outer plates 84, 86, front and rear edge plates 88, 89, and side plates 90. The rectangular units 80, 82 are interconnected such that the inner plates 84, 86 lie flush adjacent one another. The rear edge plates 89 are rigidly interconnected and rigidly secured to lower ends of the support arms 74. The front edge plates 88 are rigidly interconnected, as by welding, to define a downwardly facing, batch engaging pusher surface 92. Each unit defines a water-tight inner chamber which contains divider walls 94 extending between the inner and outer plates to form a serpentine passage 96 for conducting cooling water through the submersible portion 70 of the plunger. The passage is divided by a bulkhead plate 98 intermediate water inlet and outlet passages 100, 102 disposed in the rear edge plate 89.

To facilitate reciprocation of the plunger, a pair of mounting brackets 104 depend downwardly from the cross-member 75. Pivotably connected to the mounting brackets 104 is the upper end of a reciprocable, fluid actuated ram 106. The lower end of the ram 106 is pivotably connected to a bracket 108 mounted on the bight portion 52 of the base 24. By alternately extending and retracting the ram, submersible portion 70 of the plunger is reciprocated in a linear direction into and from the pool of molten glass.

The linear direction of reciprocation of the plunger makes an angle between forty to sixty degrees, preferably about fifty degrees, with a horizontal plane. The width of the pusher surface, i.e., its dimension in a direction perpendicular to the top and bottom plates 84, 86, is sufficiently large to assure an effective submersion of the batch materials.

As the submersible portion 70 reciprocates, it passes beneath an outlet 110 of the hopper 20. The hopper 20 is connected to the base 24 such that the outlet 110 thereof is disposed above the pool of melt. The hopper includes side walls 112 and an inclined bottom wall 114 connected between the legs of the base in order to support the hopper. The length of the hopper outlet 110, i.e., in a horizontal direction perpendicular to the direction of movement of the plunger, is essentially commensurate with the corresponding length of the plunger so that the plunger 28 underlies the entire outlet 110.

It is not necessary for the outlet 110 to be valved or metered in any way, although that can be achieved if desired. Also, it is unnecessary to dispose the plunger immediately beneath the outlet 110; a gap can be formed therebetween. Thus, it is acceptable that the batch material is able to flow continuously into the melt regardless of the position of the plunger. Such material will eventually be submersed by the plunger.

Since the batch material is of less density than the molten glass, it tends to migrate upwardly toward the surface of the melt even after being submersed. Although the batch materials are sufficiently wetted at this point to prevent entrainment thereof within air flows within the furnace, it is desirable to prevent the batch materials from migrating back to a location beneath the hopper where an undesirable build-up of such materials might occur. This object is achieved by the barrier 30.

Figure 4:
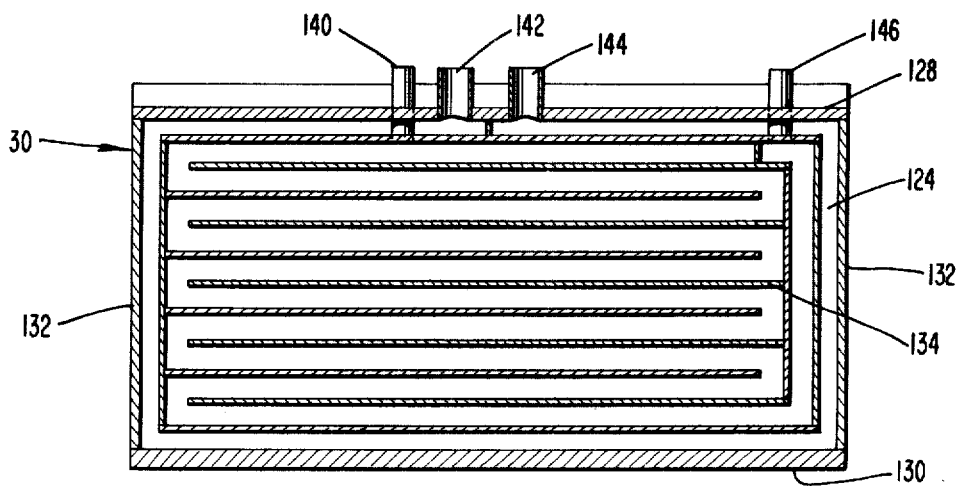
FIG. 4 is a sectional view taken through the barrier component of the apparatus.

The barrier 30 comprises inner and outer parallel plates 120, 122 spaced therebetween to form a water-cooling chamber 124 (FIG. 4). The inner plate 122 extends further upwardly than the outer plate 120, the latter having an inclined plate 126 attached thereto which diverges from the upper end of the inner plate and the upper edge of the intermediate plate. A second end plate 130 extends between the lower ends of the inner and outer plates. Side plates 132 are provided to close-off the chamber in a water-tight chamber. A series of inner walls 134 are provided within the chamber and which extend between the upper and lower plates to define serpentine water conducting passages for circulating cooling water through the barricade. Water inlets 140, 142 and outlets 144, 146 are provided in the upper end plate which communicate with the water conducting passages.

Preferably, the barrier is arranged such that the lower plate 122 thereof is disposed generally parallel to the direction of motion of the plunger 28.

The barrier is rotatably mounted on the base and is rotatable about a horizontal axis 150 defined by a bracket connection on the base. An extension 152 of the bracket includes arcuate slots 154 which are oriented concentric relative to the axis 150. Bolts 156 pass through the slots 154 and are connectible to the hopper 20. The barrier is rotatable about the axis 150 to adjust the degree of inclination thereof. The bracket extension 152 moves with the barrier and can be fixed in selected positions by the screws 156.

In order to circulate cooling water through the base 24, the submersible portion 70 of the plunger 28, and the barrier 30, a suitable source of cooling water (not shown) is provided along with individual water pumps for the base, plunger, and barrier. Cooling water is continually circulated separately through those components to prevent damage thereto from the high temperatures encountered in the furnace.

In operation, the batch dispensing and submersing apparatus is positioned as a unit at the doghouse portion of the furnace. That is, the unit is preassembled by mounting the hopper 20 and barrier 30 on the base 24, and by mounting the base 24, and the plunger support portion 74 onto the frame 22 at the doghouse, whereupon the frame is anchored to the floor behind the doghouse and the base 24 rests upon the wall 16 of the furnace. Accordingly, the unit can be conveniently positioned at the doghouse without the need for substantial modifications being made to the furnace or without the need for substantial time and effort for connecting and disassembling the unit relative to the furnace.

With the unit disposed in the operable position, cooling water is circulated through the base 24, the submersible portion 70 of the plunger 28, and the barrier 30 by means of the water circulating pumps (not shown). Batch material is deposited into the hopper 20 from which it gravitates onto the pool of molten glass. The plunger 24 is reciprocated by the ram 106 at a prescribed rate, in order to submerse the deposited batch material beneath the surface of the pool of molten glass. The lowermost position of the pusher face 92 of the plunger is located adjacent the lower end of the barrier 30, as illustrated in dotted lines in FIG. 2, whereupon it is assured that essentially all of the submersed batch material, when rising to the surface, will be situated forwardly of the barrier 30, i.e., on the opposite side of the hopper outlet 110. In this manner, no unwanted accumulations of batch material will occur beneath the hopper outlet 110.

It will be appreciated that apparatus according to the present invention may be provided at each of the doghouse compartments 14 and operated alternately, as discussed earlier.

By submersing the batch material beneath the surface of the melt, it is assured that such material becomes sufficiently wetted so as to be unable to become entrained within an air flow in the furnace even after the batch material migrates back to the surface of the melt.

The assembly according to the present invention is easily assembled and can be adapted to any existing doghouse without appreciable modifications.

The linear reciprocation of the plunger is particularly effective in pushing the batch materials beneath the surface of the molten material.

The assembly of the unit is particularly facilitated by the use of the base 24 to which the other components are assembled. The water-cooled base also aids in insulating the non-cooled portions of the apparatus from the furnace.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus for feeding glass batch materials into a pool of molten glass within a furnace, comprising:
    a base disposed at a batch-feeding end of the furnace above and extending over the pool of molten glass,
    a hopper for dispensing glass batch materials mounted on said base and including an outlet disposed over said pool of molten glass such that all of the dispensed batch materials enter said pool from above,
    a plunger means mounted on said base and including a reciprocable plunger and an actuator for reciprocating the plunger in a vertically inclined linear direction past said hopper outlet into and from the pool of molten glass at the location where batch materials are deposited thereon;
        said plunger including a front pusher face for pushing dispensed batch materials beneath the surface of the pool of molten glass, and
    a barrier mounted on said base and disposed on a side of said hopper outlet opposite said plunger, said barrier extending into the pool of molten material substantially parallel to the direction of reciprocation of said plunger and terminating adjacent the lowermost extent of travel of said pusher face so that batch materials submerged by said plunger travel beneath and past said barrier and are isolated from said batch depositing location.

2. Apparatus according to claim 1, wherein said base is U-shaped including a pair of leg portions and a bight portion, said leg portions extending horizontally over the pool of molten glass and defining a recess therebetween, said bight portion being supported on the top of a side wall of the furnace; said leg portions and bight portion containing internal water passage means with an inlet and outlet for circulating cooling water.

3. Apparatus according to claim 1, wherein said plunger means comprises a support including a pair of parallel guide rods, said plunger being slidably mounted on said guide rods and including front and rear portions, said actuator comprising an extensible-retractible ram connected between said base and said rear portion of said plunger for reciprocating said plunger.

4. Apparatus according to claim 1, wherein said barrier is mounted for adjustable swinging movement to said base to adjust the inclination thereof relative to vertical.

5. Apparatus according to claim 1, wherein said barrier, base, and plunger contain passages for circulating cooling water.

* * * * *